(12) United States Patent
Kanehisa et al.

(10) Patent No.: US 6,886,894 B2
(45) Date of Patent: May 3, 2005

(54) BICYCLE HUB AXLE

(75) Inventors: Takanori Kanehisa, Sakai (JP); Nobukatsu Hara, Izumisano (JP); Takuji Tatsumi, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/373,866

(22) Filed: Feb. 27, 2003

(65) Prior Publication Data

US 2004/0169418 A1 Sep. 2, 2004

(51) Int. Cl.$^7$ ............................................. B60B 35/00
(52) U.S. Cl. ................. 301/121.1; 180/385; 301/111.03
(58) Field of Search ............................. 301/124.1, 125, 301/111.03, 111.01, 124.2, 111; 180/385, 258, 276, 252, 259

(56) References Cited

U.S. PATENT DOCUMENTS

| | | | | |
|---|---|---|---|---|
| 4,400,038 A | * | 8/1983 | Hosokawa | ............... 301/124.2 |
| 5,516,131 A | * | 5/1996 | Novotny | .................... 280/204 |
| 5,865,560 A | * | 2/1999 | Mercat et al. | ........... 403/322.4 |
| 5,891,115 A | * | 4/1999 | Hauer et al. | ............. 301/111.01 |
| 6,241,322 B1 | * | 6/2001 | Phillips | .................... 301/124.2 |

OTHER PUBLICATIONS

Sixteen (16) photos of bicycle and fishing rod parts: photos taken on or before Feb. 6, 2003 in Japan.

* cited by examiner

*Primary Examiner*—Frantz F. Jules
(74) *Attorney, Agent, or Firm*—Shinjyu Global IP Counselors

(57) ABSTRACT

A bicycle hub is provided with a hub axle assembly, a hub shell and a pair of bearing units. The hub axle assembly basically has a hub axle washer, a bicycle hub axle and a washer retaining portion or member. The hub axle washer includes an outer peripheral surface and an inner peripheral surface defining an axle receiving opening. The bicycle hub axle includes a shaft portion and a head portion with the washer retaining member or portion being located on the shaft portion to retain the hub axle washer on the shaft portion. In the preferred embodiment, the washer retaining portion or member is a resilient member in the form of a flexible O-ring.

38 Claims, 6 Drawing Sheets

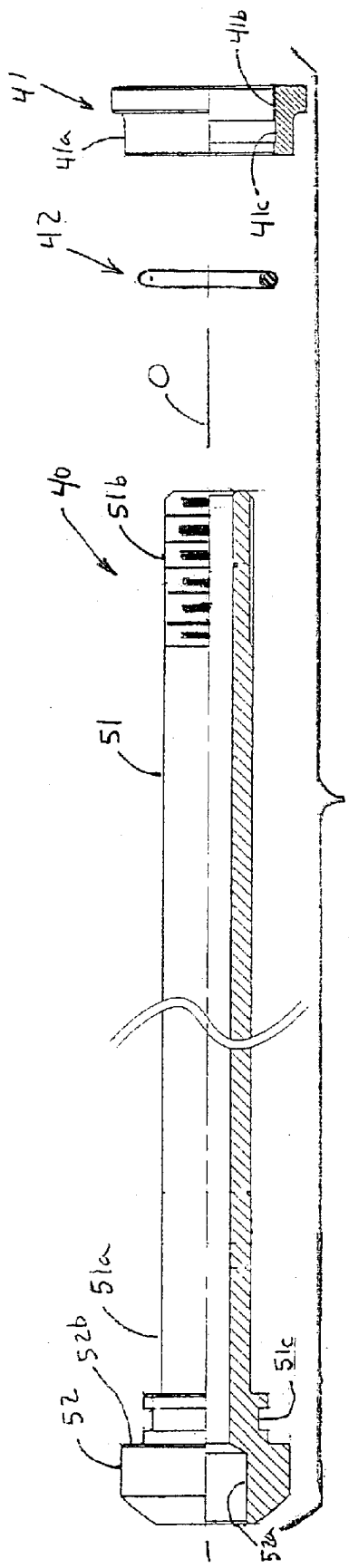
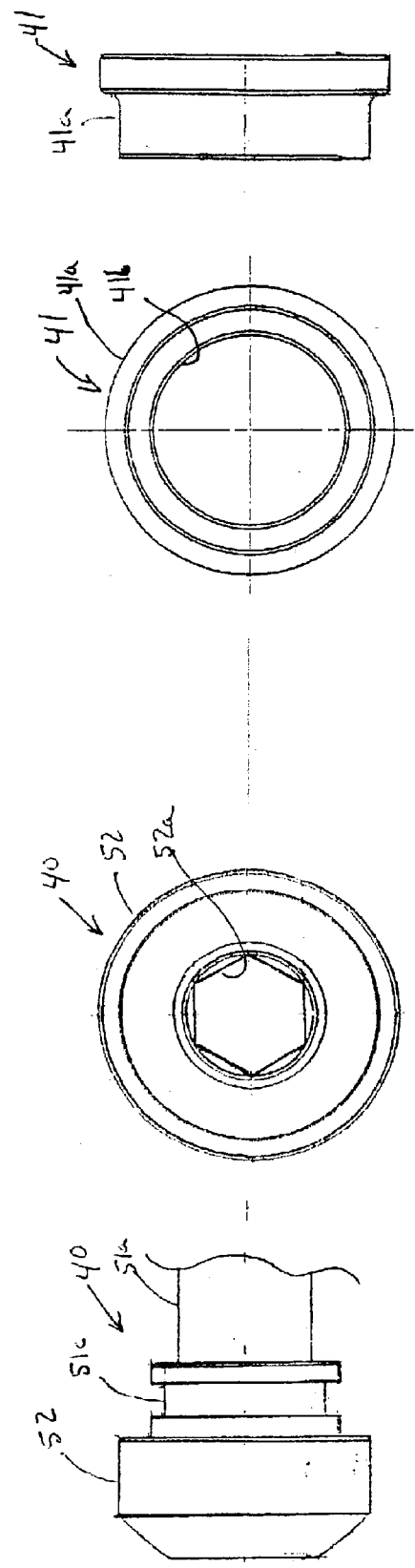
Fig. 3
Fig. 4
Fig. 5
Fig. 6
Fig. 7

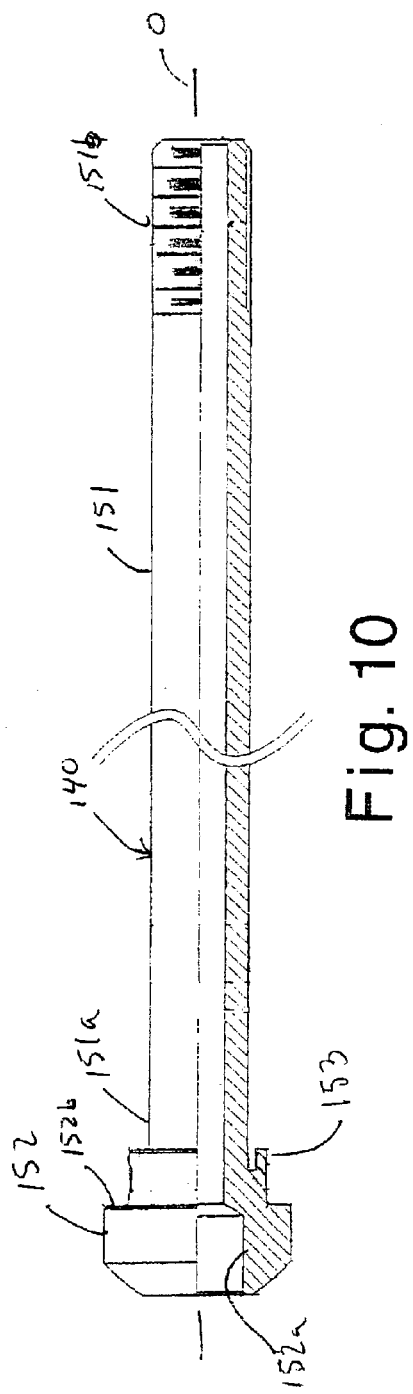
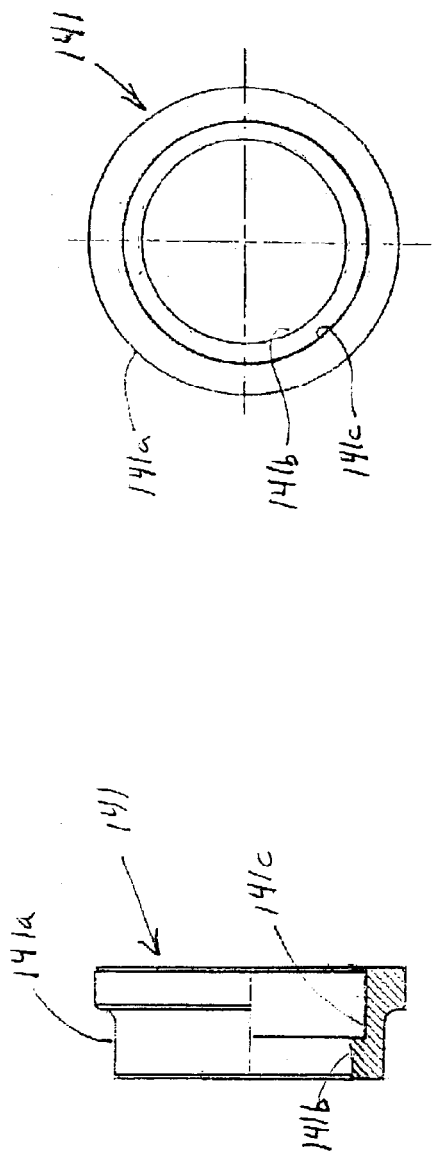
Fig. 10
Fig. 11
Fig. 12

BICYCLE HUB AXLE

BACKGROUND OF THE INVENTION

1. Field of the Invention

The present invention generally relates to a bicycle fixing bolts such as a bicycle hub axle. More specifically, the present invention relates to a bicycle hub axle that has a washer retained thereon.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the hubs of the bicycle. One of the most important aspects of a bicycle is how well the wheels rotate relative to the bicycle frame. Thus, it is important to construct wheels that are inexpensive and easy to assembly, while maintaining good performance.

Basically, the wheels of a bicycle usually include a rim with a tire coupled to a hub by a plurality of spokes. The hub has a hub shell rotatably supported on an axle by a pair of bearing assemblies. Thus, the axle is fixed to the bicycle frame and a hub shell that is rotatably supported on the axle. The spokes are coupled between the hub shell and the rim. Typically, the rim is linked to the hub shell by spoke nipples that thread onto the radially outward ends of the spokes. However, recently, some bicycle wheel designs have reversed the spoke arrangement so that each of the spokes has an outer portion secured to the rim and a threaded end secured to the hub shell. The inner end can be secured to the hub shell via conventional spoke nipples. The conventional spoke nipples typically include a head portion and an internally threaded shaft portion.

In the past, the bicycle hubs have hub axles in which the hub axle washers can easily fall off during assembly of the hub. This can result in lost time in assembling and/or disassembling the hub.

In view of the above, it will be apparent to those skilled in the art from this disclosure that there exists a need for a bicycle hub with an improved bearing assembly. This invention addresses this need in the art as well as other needs, which will become apparent to those skilled in the art from this disclosure.

SUMMARY OF THE INVENTION

One object of the present invention is to provide a bicycle hub axle in which a hub axle washer is retained on the hub axle for easy installation.

Another object is to provide a high quality bicycle hub that is relatively easy to produce at a reasonable price.

One aspect of the present invention can basically be attained by providing a bicycle hub axle assembly comprising a hub axle washer and a hub axle washer including an outer peripheral surface and an inner peripheral surface defining an axle receiving opening. The bicycle hub axle includes a shaft portion, a head portion and a washer retaining portion. The shaft portion includes a first axle end and a second axle end with threads formed the second axle end and a center axis extending between the first and second axle ends. The head portion is formed on the first axle end of the shaft portion. The head portion includes a tool engaging surface and an axial abutment surface facing towards the second axle end. The washer retaining portion is located on the first axle end of the shaft portion to retain the hub axle washer on the first axle end of the shaft portion.

Another aspect of the present invention can basically be attained by providing a bicycle bolt assembly comprising a washer, a bicycle bolt, and a resilient member. The washer includes an outer peripheral surface and an inner peripheral surface defining an axle receiving opening. The bicycle bolt includes a shaft portion having a first axle end and a second axle end with threads formed the second axle end, and a head portion formed on the first axle end of the shaft portion. The head portion includes a tool engaging surface and an axial abutment surface facing towards the second axle end. The resilient member is retained on the first axle end of the shaft portion and is disposed such that the washer is retained on the first axle end of the shaft portion.

Another aspect of the present invention can basically be attained by providing a bicycle hub comprising a hub axle washer, a hub axle assembly, and a hub shell. The hub axle washer includes an outer peripheral surface and an inner peripheral surface defining an axle receiving opening. The hub axle includes a shaft portion, a head portion and a washer retaining portion. The hub shell has a first shell end and a second shell end with an inner tubular surface forming a central passage extending between the first and second shell ends. The hub axle is disposed within the central passage of the hub shell such that the hub shell is rotatably supported on the hub axle. The shaft portion of the hub axle includes a first axle end and a second axle end with threads formed the second axle end and a center axis extending between the first and second axle ends. The head portion is formed on the first axle end of the shaft portion. The head portion includes a tool engaging surface and an axial abutment surface facing towards the second axle end. The washer retaining portion is located on the first axle end of the shaft portion to retain the hub axle washer on the first axle end of the shaft portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is an exploded elevational view of the bicycle hub axle assembly illustrated in FIG. 2, with the bottom half shown in cross-section, in accordance with the first embodiment of the present invention;

FIG. 4 is an enlarged partial elevational view of the head portion of the bicycle hub axle illustrated in FIGS. 2 and 3 in accordance with the first embodiment of the present invention;

FIG. 5 is an end elevational view of the head portion of the bicycle hub axle illustrated in FIG. 4 in accordance with the first embodiment of the present invention;

FIG. 6 is an end elevational view of the axle washer for the bicycle hub axle illustrated in FIGS. 2 and 3 in accordance with the first embodiment of the present invention;

FIG. 7 is a side elevational view of the axle washer for the bicycle hub axle illustrated in FIG. 6 in accordance with the first embodiment of the present invention;

FIG. 10 is an elevational view of the alternate bicycle hub axle illustrated in FIGS. 8 and 9, prior to deformation, in accordance with the second embodiment of the present invention;

FIG. 11 a side elevational view of the axle washer for the bicycle hub axle assembly illustrated in FIG. 8, with the bottom half shown in cross-section, in accordance with the second embodiment of the present invention;

FIG. 12 is an end elevational view of the axle washer illustrated in FIG. 8 in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
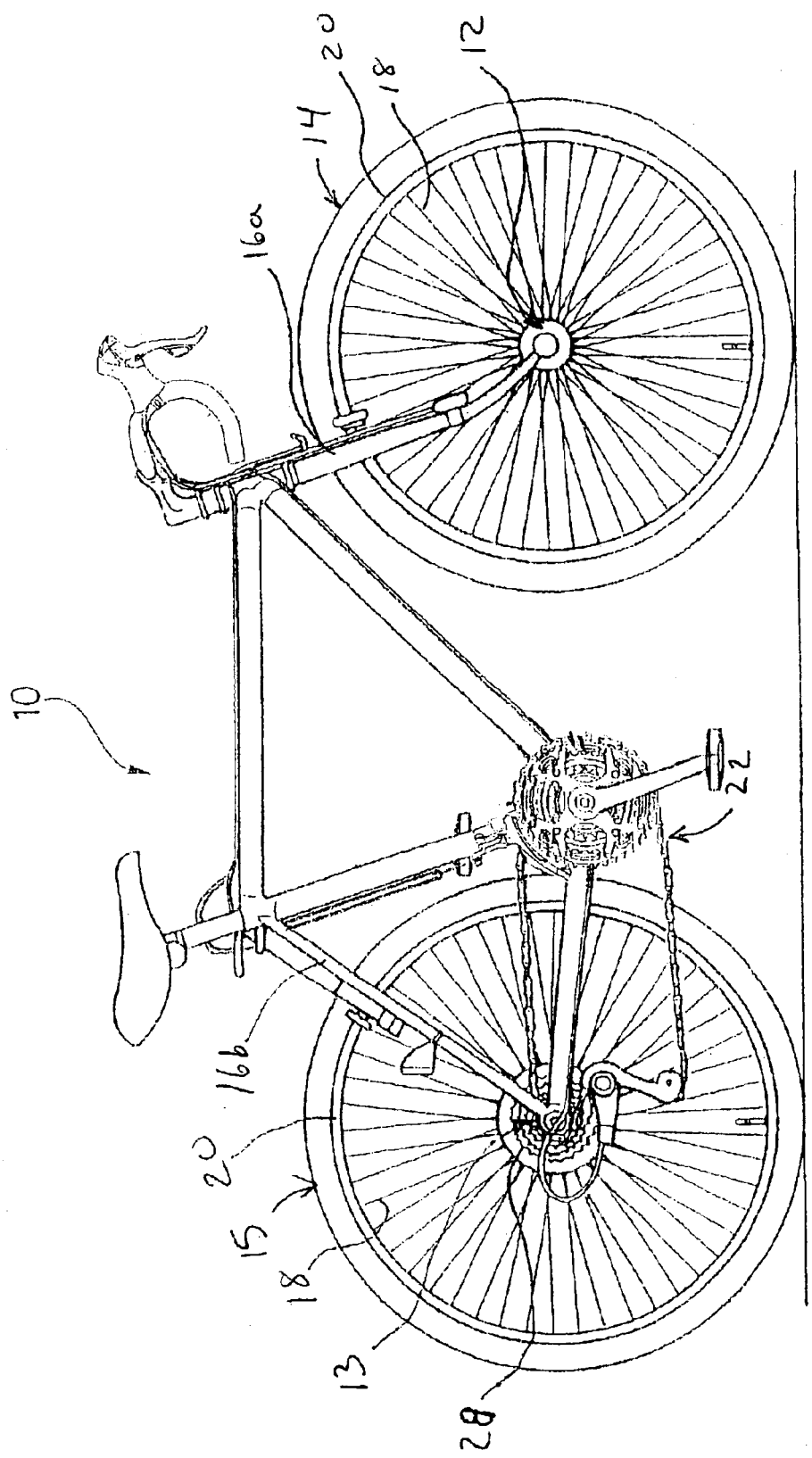
FIG. 1 is a side elevational view of a conventional bicycle with front and rear bicycle hubs in accordance with preferred embodiments of the present invention.

Referring initially to FIG. 1, a bicycle 10 is illustrated with a front bicycle hub 12 and a rear bicycle hub 13 in accordance with a first embodiment of the present invention. The front bicycle hub 12 is part of a front wheel 14, while the rear bicycle hub 13 is part of a rear wheel 15. The front bicycle hub 12 is rotatably coupled to a front fork 16a that is movably coupled to a bicycle frame 16b. The rear bicycle hub 13 is rotatably coupled to a rear fork section of the bicycle frame 16b. In particular, the front and rear wheels 14 and 15 have a plurality of spokes 18 extending outwardly the front and rear bicycle hubs 12 and 13 that are coupled to front and rear annular rims 20, respectively. The spokes 18 are coupled to the rims 20 by spoke nipples (not shown) such that the tension in the spokes 18 can be adjusted in a conventional manner. Pneumatic tires are mounted on the outer surface of the rims 20. The bicycle 10 also includes a drive train 22 for propelling the bicycle 10 in a conventional manner. In the illustrated embodiment, each of the front and rear wheels 14 and 15 has thirty-two spokes. Of course, it will be apparent to those skilled in the art from this disclosure that the front and rear wheels 14 and 15 can have fewer or more of the spokes than illustrated, if needed and/or desired. Each of the spokes 18 has an outer threaded end or spoke head coupled to the rim 20 by a spoke nipple and an inner bent end coupled to the bicycle hub 12 or 13 in a conventional manner. Thus, the outer ends of the spokes 18 are threadedly coupled to the spoke nipples to adjust the tension in the spokes 18.

Moreover, since most of the parts of the bicycle 10 are well known in the art, the parts of the bicycle 10 will not be discussed or illustrated in detail herein, except for the parts relating to the hubs 12 and 13 of the present invention. Moreover, various conventional bicycle parts such as brakes, derailleurs, additional sprocket, etc., which are not illustrated and/or discussed in detail herein, can also be used in conjunction with the present invention.

Figure 2:
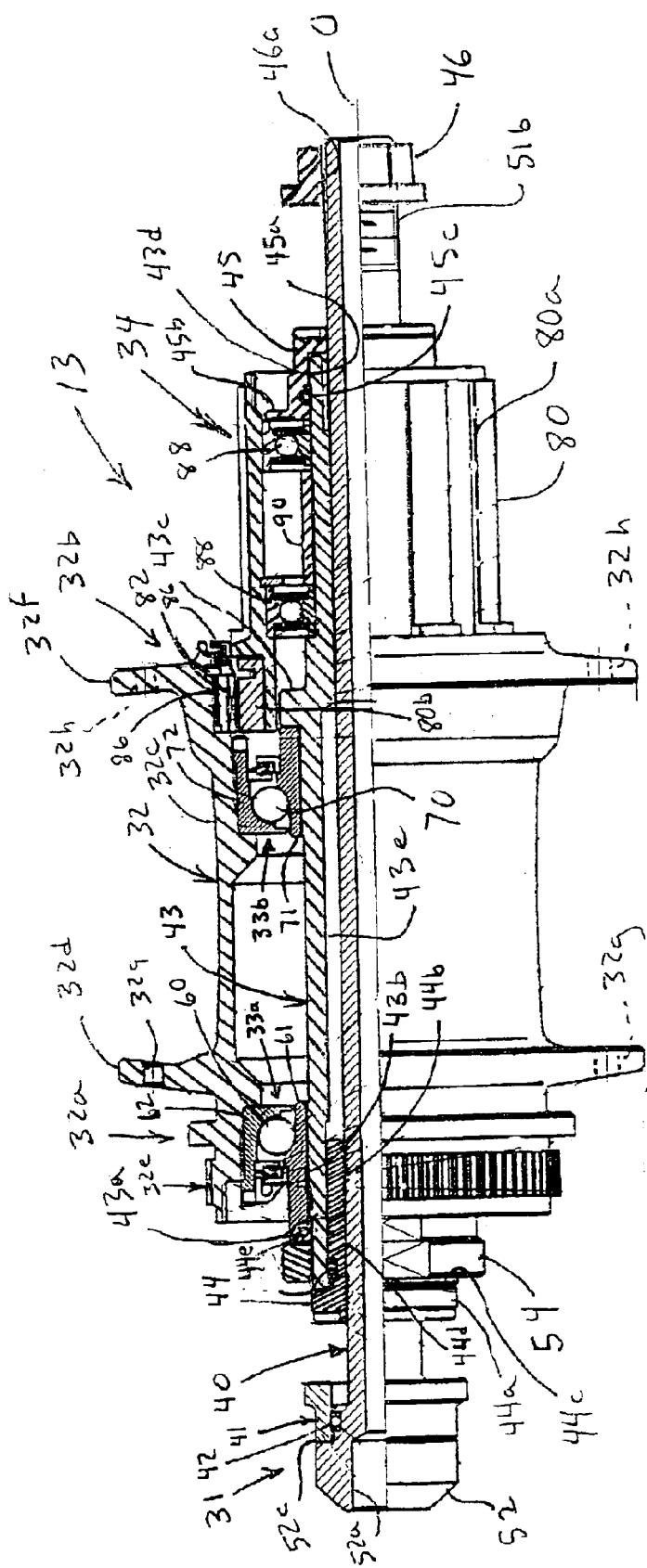
FIG. 2 is an elevational view of the rear bicycle hub illustrated in FIG. 1, with the top half shown in cross-section, in accordance with the first embodiment of the present invention.

Referring now to FIG. 2, the rear bicycle hub 13 basically includes a hub axle assembly 31, a hub shell 32, a pair of bearings 33a and 33b and a freewheel 34 for receiving the rear sprockets 28. The bearings 33a and 33b rotatably support the hub shell 32 on the hub axle assembly 31 as explained below. The bearings 33a and 33b are threaded into opposite ends of the hub shell 32 to rotatably support the hub shell 32 on the hub axle assembly 31 as explained below. Optionally, a disc brake rotor (not shown) can be attached to the rear bicycle hub 13 by a retaining or locking ring that is mounted on the left side of the hub shell 32 such as disclosed in U.S. Pat. No. 6,371,252 to Kanehisa (Assigned to Shimano, Inc.). In FIG. 2, the locking ring is not installed on the left end of the hub shell 32 for purposes of illustration.

As best seen in FIG. 2, the hub axle assembly 31 basically includes a spindle or hub axle 40, a hub axle washer 41, a washer retaining portion or member 42, an axle sleeve 43, a left hub end cap or member 44, a right hub end cap or member 45 and a hub axle nut 46. The hub axle assembly 31 rotatably supports the hub shell 32 via the bearings 33a and 33b and the freewheel 34. As explained below, the freewheel 34 limits rotation of the hub shell 32 to one rotational direction relative to the hub axle assembly 31. The front bicycle hub 12 preferably includes a hub axle assembly 31 that is substantially identical to hub axle assembly 31 of the rear bicycle hub 13. Thus, the front bicycle hub 12 will not be discussed or illustrated herein.

As best seen in FIGS. 3 and 4, the hub axle 40 is a hard, rigid member that includes a shaft portion 51 and a head portion 52. The shaft portion 51 and the head portion 52 are preferably integrally formed as a one-piece, unitary member from a suitable hard, rigid material. The hub axle 40 and the hub axle nut 46 contact the bicycle frame 16b to secure the hub axle assembly 31 thereto. The shaft portion 51 includes a first axle end 51a and a second axle end 51b with threads formed the second axle end 51b. The head portion 52 is fixedly coupled to the first axle end 51a. A center axis O extends longitudinally between the first and second axle ends 51a and 51b. The head portion 52 including a tool engaging surface 52a at one end and an axial abutment surface 52b at the other end facing towards the second axle end 51*b*. The tool engaging surface 52*a* of the head portion 52 is an axially extending blind bore with a non-circular transverse cross section, preferably a hexagonal cross section.

An annular groove 51*c* is located on an enlarged annular section of the first axle end 51*a* of the shaft portion 51 to retain the hub axle washer 41 on the first axle end 51*a* of the shaft portion 51. The resilient member 42 is disposed in the groove 51*c* to releasably retain the resilient member 42 on the first axle end 51*a* of the shaft portion 51.

As seen in FIG. 2, the hub axle washer 41 is disposed on the enlarged section of the first axle end 51*a* of the shaft portion 51 that has a maximum diameter that is greater than a maximum diameter of the second axle end 51*b* of the shaft portion 51. As best seen in FIGS. 6 and 7, the hub axle washer 41 includes an annular outer peripheral surface 41*a* and an annular inner peripheral surface 41*b* defining an axle receiving opening. The outer peripheral surface 41*a* of the hub axle washer 41 has an annular step shape. The inner peripheral surface 41*b* of the hub axle washer 41 includes an annular groove 41*c* with the resilient member 42 disposed therein. Preferably, the groove 51*c* of the first axle end 51*a* of the shaft portion 51 is deeper than the groove 41*c* of the hub axle washer 41.

Preferably, the resilient member 42 is a flexible O-ring that is constructed of a resilient, flexible material such as an elastomeric material. The inner radial width or diameter of the opening of the resilient member 42 is slightly smaller than the outer width or diameter of the groove 51*c* of the first axle end 51*a* of the shaft portion 51. The outer radial width or diameter of the resilient member 42 is slightly larger than the inner width or diameter of the groove 41*c* of the hub axle washer 41. Thus, the resilient member 42 is slightly compressed in the radial direction when the hub axle washer 41 is installed over the resilient member 42, which is disposed in the groove 51*c* of the first axle end 51*a* of the shaft portion 51. In this construction, the hub axle washer 41 can be easily removed and/or replaced as needed and/or desired without damaging the resilient member 42.

As seen in FIG. 2, the axle sleeve 43 is a tubular member that is concentrically mounted on the hub axle 40. The axle sleeve 43 has a first end 43*a* with external threads 43*b*, an annular abutment 43*c* and a second end 43*d* with the freewheel 34 fixedly coupled thereto. The external threads 43*b* of the axle sleeve 43 receive a locking nut 54. The locking nut 54 retains the bearings 33*a* and 33*b* between the hub shell 32 and the axle sleeve 43. The axle sleeve 43 has a center bore 43*e* that receives the hub axle 40 therein. The annular abutment 43*c* axially supports the outer end of the second bearing 33*b* such that the axial compressive forces are applied to the first and second bearings 33*a* and 33*b* by the locking nut 54 when it is threaded onto the external threads 43*b* of the axle sleeve 43.

The hub shell 32 will now be briefly described. Preferably, the hub shell 32 is preferably formed as a one-piece, unitary member. It will be apparent to those skilled in the art from this disclosure that the hub shell 32 can be constructed of any substantially rigid material, such as those materials, which are known in the art. For example, the hub shell 32 can be constructed of any suitable metallic material, such as plated steel, stainless steel, aluminum, magnesium or titanium, as well as other non-metallic materials, such as carbon fiber composite, ceramic or plastic. Of course, the hub shell 32 could be constructed of several pieces of various different materials as need and/or desired.

The hub shell 32 has a first or left shell end 32*a* and a second or right shell end 32*b* with a center tubular portion 32*c* located therebetween. The first and second hub shell ends 32*a* and 32*b* are integral formed with the center tubular portion 32*c* as a one-piece, unitary member. The hub shell 32 is a tubular member having an inner tubular surface forming a central interior passage extending between the first and second shell ends 32*a* and 32*b*. The hub axle 40 is disposed within the central interior passage of the hub shell 32. The first and second bearings 33*a* and 33*b* rotatably support the hub shell 32 on the hub axle 40 for rotating the hub shell 32 relative to the hub axle 40.

The first shell end 32*a* has a first spoke attachment portion or flange 32*d* and a brake rotor attachment portion 32*e*, while the second shell end 32*b* has a second spoke attachment portion or flange 32*f*. The first spoke flange 32*d* is preferably an annular member with a plurality of first spoke holes 32*g* that are equally spaced apart about the imaginary circle that is centered on the axis O. The first spoke holes 32*g* are arranged to receiving the bent ends of the spokes 18. Similarly, the second spoke flange 32*f* is preferably an annular member with a plurality of second spoke holes 32*h* in the second spoke flange 32*f* for receiving the bent ends of the spokes 18. The second spoke holes 32*h* are equal in number to the number of the first spoke holes 32*g*. The second spoke holes 32*h* are circumferentially offset relative to the first spoke holes 32*g* such that the first and second spoke holes 32*g* and 32*h* are not axially aligned. In the illustrated embodiment, the second spoke holes 32*h* are equally spaced apart about the imaginary circle that is centered on the center axis O of the hub axle assembly 31.

The left hub end cap 44 is a tubular member that has an annular end flange 44*a* and a tubular section 44*b*. The left hub end cap 44 is fixedly coupled to the first end 43*a* of the axle sleeve 43. Preferably, the left hub end cap 44 is press-fitted into the center bore 43*e* of the first end 43*a* of the axle sleeve 43. The end flange 44*a* preferably has a larger diameter than the second tubular section 44*b* so as to form a radial abutment surface 44*c* that contacts the axial end surface of the first end 43*a* of the axle sleeve 43. The second tubular section 44*b* has an outer diameter that is a size to be slidably received within the center bore 43*e* of the axle sleeve 43 at the first end 43*a* of the axle sleeve 43. The left hub end cap 44 has a center bore 44*d* that is sized to slidably receive the shaft portion 51 of the hub axle 40 therein. Thus, the hub axle 40 can be easily removed from the axle sleeve 43 to replace the rear derailleur 20.

Preferably, the outer surface of the tubular section 44*b* has an annular recess with an elastomeric O-ring or sealing member 44*e* located therein. The sealing member 44*e* frictionally retains the left hub end cap 44 in the center bore 43*e* of the first end 43*a* of the axle sleeve 43. The sealing member 44*e* also forms a seal between the interface of the outer surface of the tubular section 44*b* and the inner surface of the center bore 43*e* of the axle sleeve 43. Thus, the left hub end cap 44 can be easily slid into and out of the center bore 43*e* of the axle sleeve 43. The end flange 44*a* has a larger outer diameter than the inner thread diameter of the external threads 43*b* of the axle sleeve 43 so as to limit axial movement of the locking nut 54 when the frame 16 contacts this wide contacting surface of the end flange 44*a*. Because the left hub end cap 44 is only frictionally retained in the center bore 43*e* of the axle sleeve 43, the left hub end cap 44 can be easily removed to loosen the locking nut 54.

The right hub end cap 45 is a cup-shaped member that is fixedly coupled to the second end 43*d* of the axle sleeve 43. The freewheel 34 is retained on the axle sleeve 43 by the right hub end cap 45. Basically, the right hub end cap 45 has an inner step-shaped tubular surface 45*a* with an outwardly extending flange 45b at its inner axial end. Preferably, the outwardly extending flange 45b is sized to substantially seal the outer axial end of the freewheel 34. Thus, right hub end cap 45 can be easily slid onto and off of the axle sleeve 43. In other words, because the right hub end cap 45 is only frictionally retained on the axle sleeve 43, the right hub end cap 45 can be easily attached and removed to install and replace the freewheel 34.

Preferably, the inner tubular surface 45a has annular recess with an elastomeric O-ring or sealing member 45c located therein. The sealing member 45c frictionally retains the right hub end cap 45 on the second end 43d of the axle sleeve 43. The sealing member 45c also forms a seal between the interface of the outer surface of the second end 43d of the hub axle 42 and the inner tubular surface 45a.

The first bearing 33a is disposed between the first axle end 40a of the hub axle 40 and the first shell end 32a of the hub shell 32 to rotatably support the first shell end 32a of the hub shell 32 on the first axle end 40a of the hub axle 40. The first or left side bearing 33a basically includes a plurality of first rolling members or balls 60 disposed between a first inner race or cone 61 supported on the first axle end 40a of the hub axle 40 and a first outer race or cup 62 threadedly coupled to the internal threads of the first shell end 32a of the hub shell 32.

Again still referring to FIG. 2, the second or right side bearing 33b is disposed between the second axle end 40b of the hub axle 40 and the second shell end 32b of the hub shell 32 to rotatably support the second shell end 32b of the hub shell 32 on the second axle end 40b of the hub axle 40. The bearing 33b basically includes a plurality of second balls 70 located between a second inner race or cone 71 supported on the second axle end 40b of the hub axle 40 and a second outer race or cup 72 threadedly coupled to the second internal threads 32r of the hub shell 32.

The hub axle nut 46 is a hard, rigid one-piece, unitary member that includes a threaded bore 46a. The threaded bore 46a is threadedly engaged with the threaded section 51b of the shaft portion 51 to secure the bicycle hub axle assembly 31 to the bicycle frame 16.

The freewheel 34 is operatively coupled between the second end of the hub axle 40 and the second end of the hub shell 32. The freewheel 34 is relatively conventional, and thus, will not be discussed or illustrated in detail herein. The freewheel 34 is coupled to the hub shell 32 in a relatively conventional manner. The sprockets 28 are mounted on the freewheel 34 in a relatively conventional manner such that rotation of the sprockets 28 results in rotation of the freewheel 34. Rotation of the freewheel 34 in turn rotates the hub shell 32. The freewheel 34 basically includes of a driving cylinder 80, a driven cylinder 82, a unidirectional rotation transmission mechanism 86 and a pair of ball bearings 88 that are axially spaced apart by a cylindrical spacer 90.

The driving cylinder 80 is a tubular member having an outer peripheral surface with a plurality of axially extending splines 80a formed at its outer end and a plurality of transmission pawls 80b (only one shown in FIG. 2) coupled to at its inner end. The inner peripheral surface of the driving cylinder 80 is rotatably supported on the axle sleeve 43 by the ball bearings 88. The transmission pawls 80b form a first part of the unidirectional rotation transmission mechanism 86. Thus, the inner axial end of the driving cylinder 80 is operatively coupled to the driven cylinder 82 via the unidirectional rotation transmission mechanism 86. The splines 80a of the driving cylinder 80 non-rotatably couple the sprockets 28 to the outer peripheral surface of the driving cylinder 80. Thus, the sprockets 28 are mounted to the driving cylinder 80 for transmitting torque to the hub shell 32 via the unidirectional rotation transmission mechanism 86.

The driven cylinder 82 has its outer peripheral surface fixed to an inner peripheral surface of the splines formed in the second shell end 32b of the hub shell 32. The driven cylinder 82 has an inner peripheral surface with serrated teeth that form a second part of the unidirectional rotation transmission mechanism 86. These serrated teeth are engaged by the transmission pawls 80b in a conventional manner. Thus, the unidirectional rotation transmission mechanism 86 is constructed of the transmission pawls 80b and the serrated teeth that form a one-way clutch that is operatively coupled between the driving cylinder 80 and the driven cylinder 82. The transmission pawls 80b are moved outwardly in a radial direction to mesh with the serrated teeth due to centrifugal forces occurring from the positive rotation of the driving cylinder 80. This engagement of the transmission pawls 80b with the serrated teeth 82a transmits the driving power or torque from the freewheel 34 to the hub shell 32 that is splined engaged with the driven cylinder 82.

Second Embodiment

Referring now to FIGS. 8–12, a hub axle assembly 131 in accordance with a second embodiment will now be explained. Basically, the hub axle assembly 131 can be used in the rear hub 13 of the first embodiment instead of the hub axle assembly 31. In view of the similarity between the hub axle assemblies 31 and 131 of the first and second embodiments, the hub axle assembly 131 will not be discussed in detail for the sake of brevity.

Figure 8:
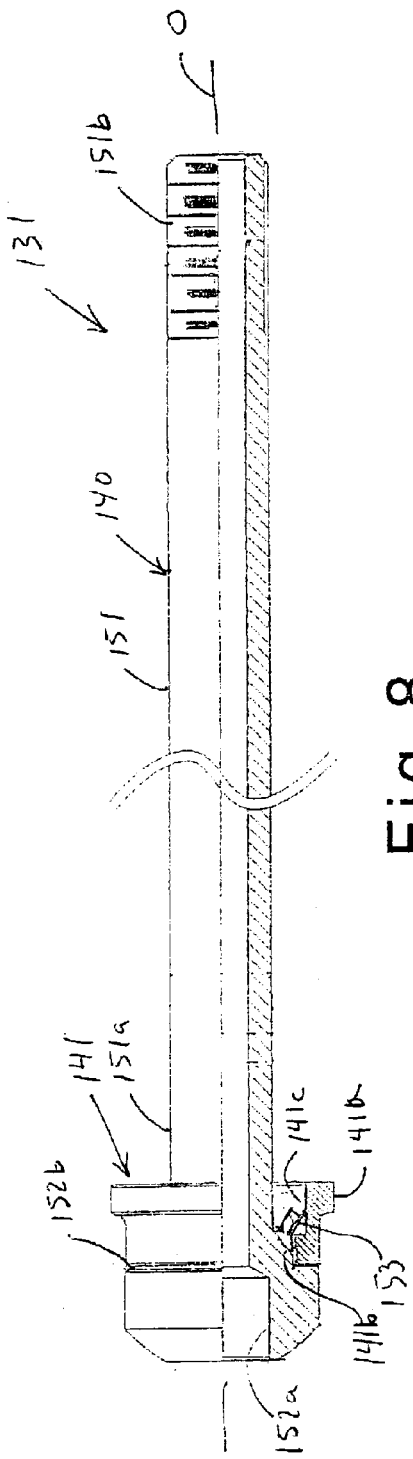
FIG. 8 is an elevational view of an alternate bicycle hub axle assembly, with the bottom half shown in cross-section, in accordance with a second embodiment of the present invention.
Figure 9:
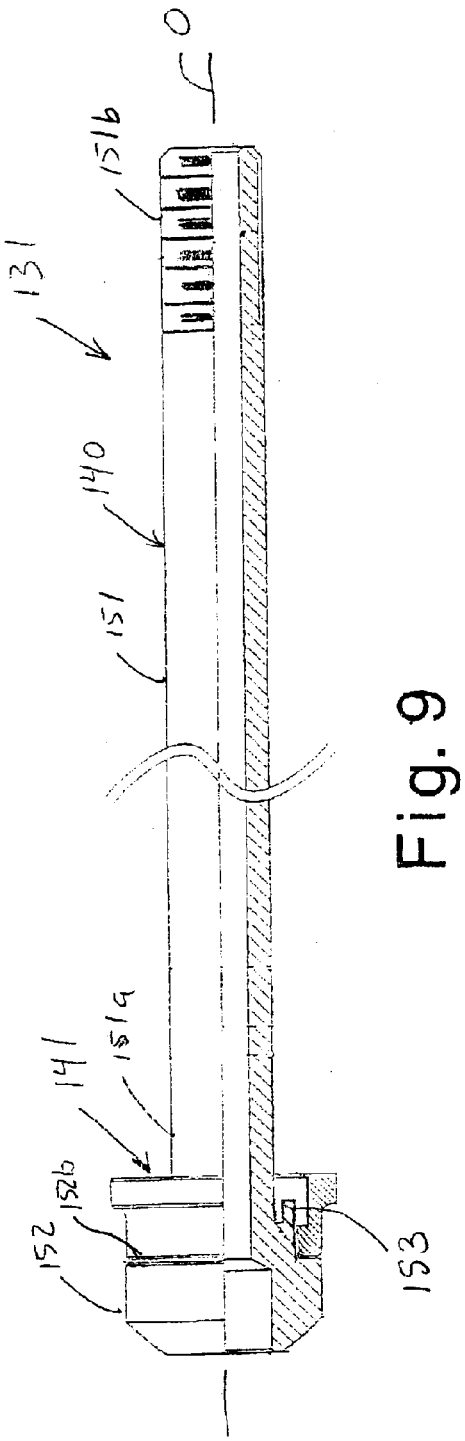
FIG. 9 is an elevational view of the alternate bicycle hub axle assembly illustrated in FIG. 8, prior to securing the washer thereto and with the bottom half shown in cross-section, in accordance with the second embodiment of the present invention.

As best seen in FIGS. 8 and 9, the hub axle assembly 131 includes a spindle or hub axle 140 and a hub axle washer 141. In this embodiment, the resilient member is eliminated. The hub axle assembly 131 further includes the axle sleeve 43, the left hub end cap or member 44, the right hub end cap or member 45 and the hub axle nut 46 from the first embodiment. Thus, the hub axle assembly 131 is designed to rotatably support the hub shell 32 of the first embodiment via the bearings 33a and 33b.

As best seen in FIG. 10, the hub axle 140 is a hard, rigid member that includes a shaft portion 151, a head portion 152 and a washer retaining flange or portion 153. The shaft portion 151, the head portion 152 and a washer retaining portion 153 are preferably integrally formed as a one-piece, unitary member from a suitable hard, rigid material. The shaft portion 151 includes a first axle end 151a and a second axle end 151b with threads formed the second axle end 151b. The head portion 152 is fixedly coupled to the first axle end 151a. A center axis O extends longitudinally between the first and second axle ends 151a and 151b. The head portion 152 including a tool engaging surface 152a at one end and an axial abutment surface 152b at the other end facing towards the second axle end 151b. The tool engaging surface 152a of the head portion 152 is an axially extending blind bore with a non-circular transverse cross section, preferably a hexagonal cross section.

The washer retaining flange 153 is an annular member that is located on an enlarged section of the first axle end 151a of the shaft portion 151 to retain the hub axle washer 141 on the first axle end 151a of the shaft portion 151. Initially, the washer retaining flange 153 extends in an axial direction as seen in FIG. 9 such that the hub axle washer 141 can be slipped over the enlarged section of the first axle end 151a of the shaft portion 151. Then, the washer retaining flange 153 is deformed outwardly in a generally radial direction to retain the hub axle washer 141 on the first axle end 151a of the shaft portion 151.

The hub axle washer 141 is disposed on the enlarged section of the first axle end 151a of the shaft portion 151 that has a maximum diameter that is greater than a maximum diameter of the second axle end 151b of the shaft portion 151. The hub axle washer 141 includes an outer peripheral surface 141a and an inner peripheral surface 141b defining an axle receiving opening. The outer peripheral surface 141a of the hub axle washer 141 has an annular step shape. The inner peripheral surface 141b of the hub axle washer 141 has an annular step shape that forms an annular recess 141c with the washer retaining flange 153 disposed therein when the washer retaining flange 153 is deformed outwardly. Thus, the washer retaining flange 153 retains the hub axle washer 141 on the first axle end 151a of the shaft portion 151.

Third Embodiment

Referring now to FIGS. 13–18, a hub axle assembly 231 in accordance with a third embodiment will now be explained. Basically, the hub axle assembly 231 can be used in the rear hub 13 of the first embodiment instead of the hub axle assembly 31. In view of the similarity between the hub axle assemblies 31 and 231 of the first and third embodiments, the hub axle assembly 231 will not be discussed in detail for the sake of brevity.

Figure 13:
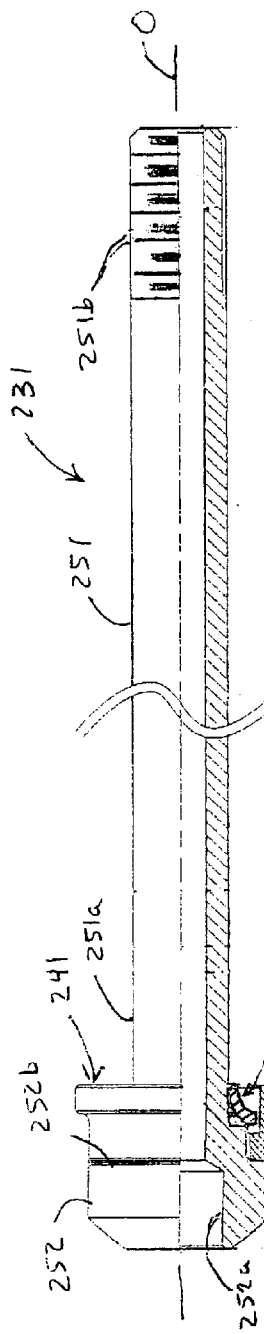
FIG. 13 is an elevational view of an another alternate bicycle hub axle assembly, with the bottom half shown in cross-section, in accordance with a third embodiment of the present invention.

As best seen in FIG. 13, the hub axle assembly 231 includes a spindle or hub axle 240 and a hub axle washer 241 and a resilient portion or member 242. In this third embodiment, the washer retaining portion includes the resilient portion or member 242a which is a press-on washer that is retained on the hub axle 240. The hub axle assembly 231 further includes the axle sleeve 43, the left hub end cap or member 44, the right hub end cap or member 45 and the hub axle nut 46 from the first embodiment. Thus, the hub axle assembly 231 is designed to rotatably support the hub shell 32 of the first embodiment via the bearings 33a and 33b.

Figure 14:
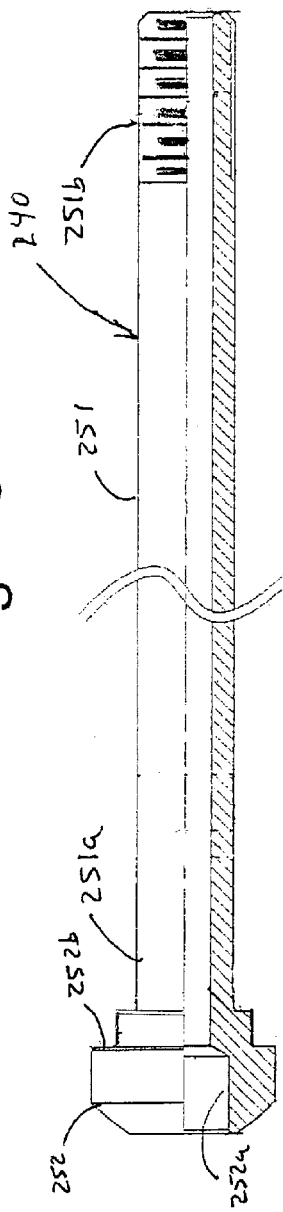
FIG. 14 is an elevational view of the alternate bicycle hub axle, with the bottom half shown in cross-section, in accordance with the third embodiment of the present invention.
Figure 15:
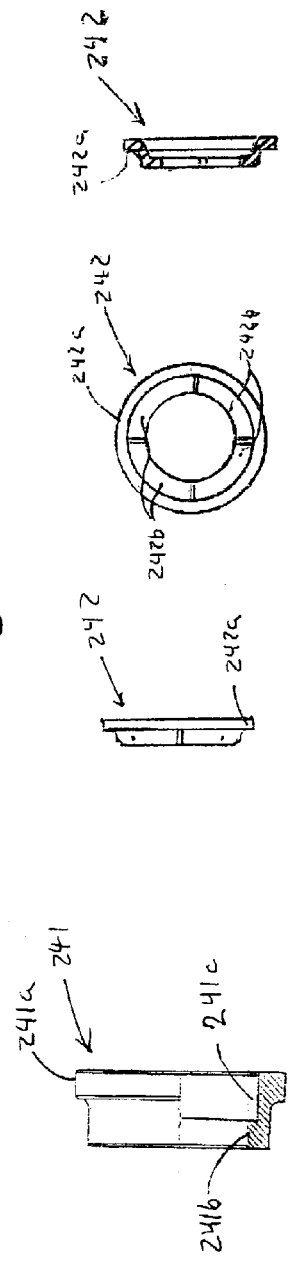
FIG. 15 is a side elevational view of the resilient retaining member for the bicycle hub axle assembly illustrated in FIG. 13 in accordance with the third embodiment of the present invention.
Figure 16:
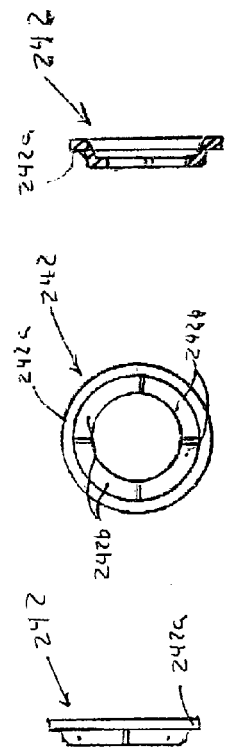
FIG. 16 is a side elevational view of the axle washer for the bicycle hub axle assembly illustrated in FIG. 13, with the bottom half shown in cross-section, in accordance with the third embodiment of the present invention.
Figure 17:
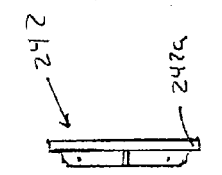
FIG. 17 is an end elevational view of the resilient retaining member illustrated in FIG. 16 in accordance with the third embodiment of the present invention.
Figure 18:
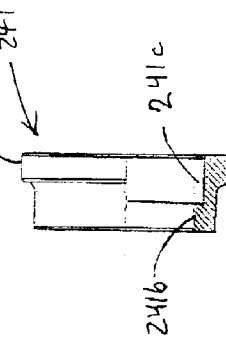
FIG. 18 is a cross-sectional view of the resilient retaining member for the alternate bicycle hub axle illustrated in FIG. 13 in accordance with the third embodiment of the present invention.

As best seen in FIG. 14, the hub axle 240 is a hard, rigid member that includes a shaft portion 251 and a head portion 252. The shaft portion 251 and the head portion 252 are preferably integrally formed as a one-piece, unitary member from a suitable hard, rigid material. The shaft portion 251 includes a first axle end 251a and a second axle end 251b with threads formed the second axle end 251b. The head portion 252 is fixedly coupled to the first axle end 251a. A center axis O extends longitudinally between the first and second axle ends 251a and 251b. The head portion 252 including a tool engaging surface 152a at one end and an axial abutment surface 252b at the other end facing towards the second axle end 251b. The tool engaging surface 252a of the head portion 252 is an axially extending blind bore with a non-circular transverse cross section, preferably a hexagonal cross section.

The hub axle washer 241 is disposed on the enlarged section of the first axle end 251a of the shaft portion 251 that has a maximum diameter that is greater than a maximum diameter of the second axle end 251b of the shaft portion 251. The hub axle washer 241 includes an annular outer peripheral surface 241a and an annular inner peripheral surface 241b defining an axle receiving opening. The outer peripheral surface 241a of the hub axle washer 241 has an annular step shape. The inner peripheral surface 241b of the hub axle washer 241 has an annular step shape that forms an annular recess 241c with the resilient member 242 disposed therein when the resilient member 242 is retained on the first axle end 251a of the shaft portion 251.

Preferably, the resilient member 242 is a flexible clip that is constructed of a resilient, flexible material such as a spring steel material. The resilient member 242 has an annular ring section 242a with four circumferentially arranged flanges 242b that define a bolt receiving opening 242c. The inner radial width or diameter of the opening 242c of the resilient member 242 is slightly smaller than the outer width or diameter of the first axle end 251a of the shaft portion 251. The outer radial width or diameter of the resilient member 242 is slightly smaller than the inner width or diameter of the annular recess 241c of the hub axle washer 241. Thus, when the resilient member 242 is installed over the shaft portion 251, the flanges 242b of the resilient member 242 are slightly bent outwardly to retain the resilient member 242 on the shaft portion 251. Since the innermost diameter of the inner peripheral surface 241b of the hub axle washer 241 is smaller than the ring section 242a of the resilient member 242, the hub axle washer 241 is retained by the resilient member 242 on the shaft portion 251.

While the present invention is illustrated in the form of a hub axle, it will be apparent to those skilled in the art from this disclosure that the present invention can be used with other bicycle bolts. For example, the structures of the hub axles and hub axle washers with their retaining members or portions can be used with a brake cable fixing bolt.

As used herein, the following directional terms "forward, rearward, above, downward, vertical, horizontal, below and transverse" as well as any other similar directional terms refer to those directions relative to a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub axle assembly comprising:
    a hub axle washer including an outer peripheral surface and an inner peripheral surface defining an axle receiving opening; and
    a bicycle hub axle including a shaft portion, a head portion and a washer retaining portion,
        the shaft portion including a first axle end and a second axle end with threads formed the second axle end and a center axis extending between the first and second axle ends,
        the head portion formed on the first axle end of the shaft portion, the head portion including a tool engaging surface and an axial abutment surface facing towards the second axle end, the washer retaining portion being located on the first axle end of the shaft portion to retain the hub axle washer on the first axle end of the shaft portion against axial free movement, and the hub axle washer being retained by the retaining portion such that an axial end face of the washer is exposed in an axial direction relative to the shaft portion.

2. The bicycle hub axle assembly according to claim 1, wherein the washer retaining portion includes a resilient member retained on the first axle end of the shaft portion.

3. The bicycle hub axle assembly according to claim 2, wherein the resilient member is a flexible O-ring.

4. The bicycle hub axle assembly according to claim 2, wherein at least one of the hub axle washer and the first axle end of the shaft portion includes a groove with the resilient member disposed therein.

5. The bicycle hub axle assembly according to claim 2, wherein the hub axle washer and the first axle end of the shaft portion each includes a groove with the resilient member disposed therein.

6. The bicycle hub axle assembly according to claim 5, wherein the groove of the first axle end of the shaft portion is deeper than the groove of the hub axle washer.

7. The bicycle hub axle assembly according to claim 1, wherein the washer retaining portion includes a press-on washer that is retained on the first axle end of the shaft portion.

8. The bicycle hub axle assembly according to claim 1, wherein the washer retaining portion is a deformed part of the first axle end of the shaft portion.

9. The bicycle hub axle assembly according to claim 1, wherein the outer peripheral surface of the hub axle washer has an annular step shape.

10. The bicycle hub axle assembly according to claim 1, wherein the hub axle washer is disposed on an enlarged section of the first axle end of the shaft portion that has a maximum diameter that is greater than a maximum diameter of the second axle end of the shaft portion.

11. A bicycle bolt assembly comprising:

a washer including an outer peripheral surface and an inner peripheral surface defining an axle receiving opening;

a bicycle bolt including a shaft portion having a first axle end and a second axle end with threads formed the second axle end, and a head portion formed on the first axle end of the shaft portion, the head portion including a tool engaging surface and an axial abutment surface facing towards the second axle end, a resilient member retained on the first axle end of the shaft portion and contacting the washer such that the washer is retained against axial free movement on the first axle end of the shaft portion by the resilient member.

12. The bicycle bolt assembly according to claim 11, wherein the resilient member is a flexible O-ring.

13. The bicycle bolt assembly according to claim 11, wherein at least one of the hub axle washer and the first axle end of the shaft portion includes a groove with the resilient member disposed therein.

14. The bicycle bolt assembly according to claim 11, wherein the hub axle washer and the first axle end of the shaft portion each includes a groove with the resilient member disposed therein.

15. The bicycle bolt assembly according to claim 14, wherein the groove of the first axle end of the shaft portion is deeper than the groove of the hub axle washer.

16. A bicycle hub comprising:

a hub axle washer including an outer peripheral surface and an inner peripheral surface defining an axle receiving opening;

a hub axle including a shaft portion, a head portion and a washer retaining portion; and a hub shell having a first shell end and a second shell end with an inner tubular surface forming a central passage extending between the first and second shell ends, the hub axle being disposed within the central passage of the hub shell such that the hub shell is rotatably supported on the hub axle;

the shaft portion of the hub axle including a first axle end and a second axle end with threads formed the second axle end and a center axis extending between the first and second axle ends, the head portion formed on the first axle end of the shaft portion, the head portion including a tool engaging surface and an axial abutment surface facing towards the second axle end, the washer retaining portion being located on the first axle end of the shaft portion, said washer retaining portion being configured and arranged to retain the hub axle washer on the first axle end of the shaft portion against axial free movement, and the hub axle washer being retained by the retaining portion such that an axial end face of the washer is exposed in an axial direction relative to the shaft portion.

17. The bicycle hub according to claim 16, wherein the washer retaining portion includes a resilient member retained on the first axle end of the shaft portion.

18. The bicycle hub according to claim 17, wherein the resilient member is a flexible O-ring.

19. The bicycle hub according to claim 17, wherein at least one of the hub axle washer and the first axle end of the shaft portion includes a groove with the resilient member disposed therein.

20. The bicycle hub according to claim 17, wherein the hub axle washer and the first axle end of the shaft portion each includes a groove with the resilient member disposed therein.

21. The bicycle hub according to claim 20, wherein the groove of the first axle end of the shaft portion is deeper than the groove of the hub axle washer.

22. The bicycle hub according to claim 16, wherein the washer retaining portion includes a press-on washer that is retained on the first axle end of the shaft portion.

23. The bicycle hub according to claim 16, wherein the washer retaining portion is a deformed part of the first axle end of the shaft portion.

24. The bicycle hub according to claim 16, wherein the outer peripheral surface of the hub axle washer has an annular step shape.

25. The bicycle hub according to claim 16, wherein the hub axle washer is disposed on an enlarged section of the first axle end of the shaft portion that has a maximum diameter that is greater than a maximum diameter of the second axle end of the shaft portion.

26. A bicycle hub axle assembly comprising:
a hub axle washer including an outer peripheral surface and an inner peripheral surface defining an axle receiving opening; and
a bicycle hub axle including a shaft portion, a head portion and a washer retaining portion;
the shaft portion including a first axle end and a second axle end with threads formed the second axle end and a center axis extending between the first and second axle ends,
the head portion formed on the first axle end of the shaft portion, the head portion including a tool engaging surface and an axial abutment surface facing towards the second axle end, and
the washer retaining portion including a flexible O-ring being retained on the first axle end of the shaft portion to retain the hub axle washer on the first axle end of the shaft portion.

27. A bicycle hub axle assembly comprising:
a hub axle washer including an outer peripheral surface and an inner peripheral surface defining an axle receiving opening; and
a bicycle hub axle including a shaft portion, a head portion and a washer retaining portion,
the shaft portion including a first axle end and a second axle end with threads formed the second axle end and a center axis extending between the first and second axle ends,
the head portion formed on the first axle end of the shaft portion, the head portion including a tool engaging surface and an axial abutment surface facing towards the second axle end,
the washer retaining portion being located on the first axle end of the shaft portion to retain the hub axle washer on the first axle end of the shaft portion, including a resilient member retained on the first axle end of the shaft portion, and
at least one of the hub axle washer and the first axle end of the shaft portion including a groove with the resilient member disposed therein.

28. A bicycle hub axle assembly comprising:
a hub axle washer including an outer peripheral surface and an inner peripheral surface defining an axle receiving opening; and
a bicycle hub axle including a shaft portion, a head portion and a washer retaining portion,
the shaft portion including a first axle end and a second axle end with threads formed the second axle end and a center axis extending between the first and second axle ends,
the head portion formed on the first axle end of the shaft portion, the head portion including a tool engaging surface and an axial abutment surface facing towards the second axle end,
the washer retaining portion being located on the first axle end of the shaft portion to retain the hub axle washer on the first axle end of the shaft portion, including a resilient member retained on the first axle end of the shaft portion, and
each of the hub axle washer and the first axle end of the shaft portion including a groove with the resilient member disposed therein.

29. The bicycle hub axle assembly according to claim 28, wherein
the groove of the first axle end of the shaft portion is deeper than the groove of the hub axle washer.

30. A bicycle bolt assembly comprising:
a washer including an outer peripheral surface and an inner peripheral surface defining an axle receiving opening;
a bicycle bolt including a shaft portion having a first axle end and a second axle end with threads formed the second axle end, and a head portion formed on the first axle end of the shaft portion, the head portion including a tool engaging surface and an axial abutment surface facing towards the second axle end; and
a flexible O-ring retained on the first axle end of the shaft portion and disposed such that the washer is retained on the first axle end of the shaft portion.

31. A bicycle bolt assembly comprising:
a washer including an outer peripheral surface and an inner peripheral surface defining an axle receiving opening;
a bicycle bolt including a shaft portion having a first axle end and a second axle end with threads formed the second axle end, and a head portion formed on the first axle end of the shaft portion, the head portion including a tool engaging surface and an axial abutment surface facing towards the second axle end; and
a resilient member retained on the first axle end of the shaft portion and disposed such that the washer is retained on the first axle end of the shaft portion,
at least one of the hub axle washer and the first axle end of the shaft portion including a groove with the resilient member disposed therein.

32. A bicycle bolt assembly comprising:
a washer including an outer peripheral surface and an inner peripheral surface defining an axle receiving opening;
a bicycle bolt including a shaft portion having a first axle end and a second axle end with threads formed the second axle end, and a head portion formed on the first axle end of the shaft portion, the head portion including a tool engaging surface and an axial abutment surface facing towards the second axle end; and
a resilient member retained on the first axle end of the shaft portion and disposed such that the washer is retained on the first axle end of the shaft portion,
each of the hub axle washer and the first axle end of the shaft portion including a groove with the resilient member disposed therein.

33. The bicycle bolt assembly according to claim 32, wherein
the groove of the first axle end of the shaft portion is deeper than the groove of the hub axle washer.

34. A bicycle hub comprising:
a hub axle washer including an outer peripheral surface and an inner peripheral surface defining an axle receiving opening;
a hub axle including a shaft portion, a head portion and a washer retaining portion; and
a hub shell having a first shell end and a second shell end with an inner tubular surface forming a central passage extending between the first and second shell ends, the hub axle being disposed within the central passage of the hub shell such that the hub shell is rotatably supported on the hub axle;

the shaft portion of the hub axle including a first axle end and a second axle end with threads formed the second axle end and a center axis extending between the first and second axle ends, the head portion formed on the first axle end of the shaft portion, the head portion including a tool engaging surface and an axial abutment surface facing towards the second axle end, and the washer retaining portion including a flexible O-ring retained on the first axle end of the shaft portion to retain the hub axle washer on the first axle end of the shaft portion.

35. A bicycle hub comprising:

a hub axle washer including an outer peripheral surface and an inner peripheral surface defining an axle receiving opening;

a hub axle including a shaft portion, a head portion and a washer retaining portion; and a hub shell having a first shell end and a second shell end with an inner tubular surface forming a central passage extending between the first and second shell ends, the hub axle being disposed within the central passage of the hub shell such that the hub shell is rotatably supported on the hub axle;

the shaft portion of the hub axle including a first axle end and a second axle end with threads formed the second axle end and a center axis extending between the first and second axle ends, the head portion formed on the first axle end of the shaft portion, the head portion including a tool engaging surface and an axial abutment surface facing towards the second axle end, the washer retaining portion including a resilient member retained on the first axle end of the shaft portion and retaining the hub axle washer on the first axle end of the shaft portion, and at least one of the hub axle washer and the first axle end of the shaft portion including a groove with the resilient member disposed therein.

36. A bicycle hub comprising:

a hub axle washer including an outer peripheral surface and an inner peripheral surface defining an axle receiving opening;

a hub axle including a shaft portion, a head portion and a washer retaining portion; and a hub shell having a first shell end and a second shell end with an inner tubular surface forming a central passage extending between the first and second shell ends, the hub axle being disposed within the central passage of the hub shell such that the hub shell is rotatably supported on the hub axle;

the shaft portion of the hub axle including a first axle end and a second axle end with threads formed the second axle end and a center axis extending between the first and second axle ends, the head portion formed on the first axle end of the shaft portion, the head portion including a tool engaging surface and an axial abutment surface facing towards the second axle end, the washer retaining portion including a resilient member retained on the first axle end of the shaft portion and retaining the hub axle washer on the first axle end of the shaft portion, and the hub axle washer and the first axle end of the shaft portion each including a groove with the resilient member disposed therein.

37. The bicycle hub according to claim 36, wherein the groove of the first axle end of the shaft portion is deeper than the groove of the hub axle washer.

38. A bicycle hub axle assembly comprising:

a hub axle washer including an outer peripheral surface and an inner peripheral surface defining an axle receiving opening; and a bicycle hub axle including a shaft portion, a head portion and a washer retaining portion, the shaft portion including a first axle end and a second axle end with threads formed the second axle end and a center axis extending between the first and second axle ends, the head portion formed on the first axle end of the shaft portion, the head portion including an end face with a tool engaging surface disposed within the end face that faces away from the second axle end, and an axial abutment surface facing towards the second axle end, and the washer retaining portion being located on the first axle end of the shaft portion to retain the hub axle washer on the first axle end of the shaft portion.

* * * * *